W. P. QUACKENBUSH.
Cheese-Safe.
No. 160,467.
Patented March 2, 1875.
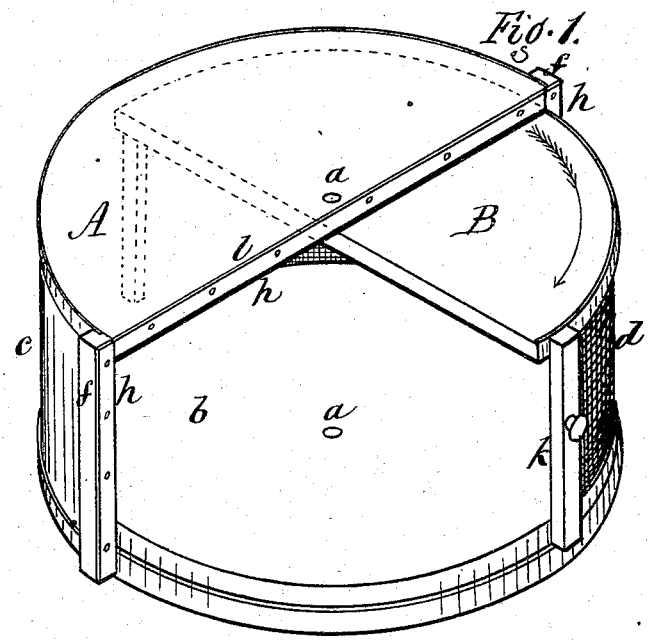
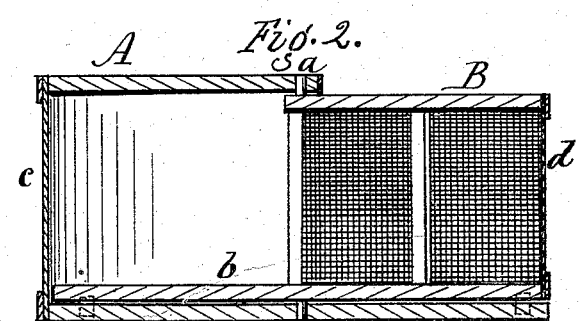
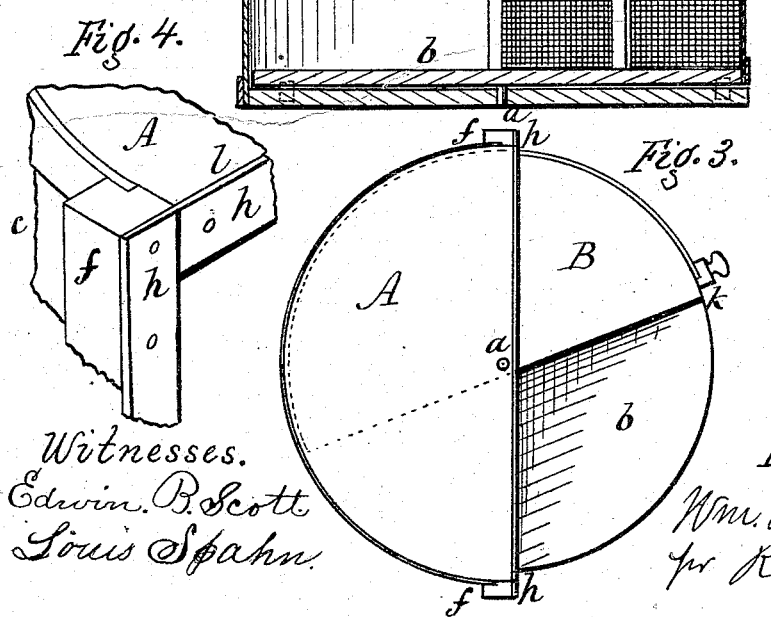
Witnesses.
Edwin B. Scott
Louis Spahn.
Inventor.
Wm. P. Quackenbush,
pr R. F. Osgood,
Atty.

UNITED STATES PATENT OFFICE.

WILLIAM P. QUACKENBUSH, OF HOLLEY, NEW YORK, ASSIGNOR OF ONE-HALF HIS RIGHT TO HENRY M. LATIMER, OF SAME PLACE.

IMPROVEMENT IN CHEESE-SAFES.

Specification forming part of Letters Patent No. 160,467, dated March 2, 1875; application filed October 24, 1874.

*To all whom it may concern:*

Be it known that I, WILLIAM P. QUACKENBUSH, of Holley, in the county of Orleans and State of New York, have invented a certain new and useful Improvement in Cheese-Safes; and I do hereby declare that the following is a full, clear, and exact description of the construction and operation of the same, reference being had to the accompanying drawings, in which—

Figure 1 is a perspective view of the safe partially thrown open. Fig. 2 is a vertical section of the same closed. Fig. 3 is a plan in the same position as Fig. 1. Fig. 4 is a detail view in perspective, showing the packings.

The object of my invention is to provide a box for grocers' use, in which cheese can be kept secure from insects and dust, and in which, in the act of opening the safe, the cheese itself will be turned to proper position for cutting.

Cheese-boxes are already known having one section of the side sliding within the other, and a revolving platform, on which the cheese rests; but in such cases the box has first to be opened, and the platform afterward turned to position, thus requiring a double action.

My invention consists of a cheese-box formed in halves, turning one within the other, the inner half having a fixed bottom, which revolves with it, and the joints between the two having packings for excluding insects and dust, as hereinafter described.

In the drawings, A B represent the two half-circular sections constituting the box. The section B is located inside the outer one, A, and turns on pivots $a\ a$. When turned in one direction it closes entirely within the outer section, so as to leave the box fully open, and when turned in the other direction the edges abut and leave the box closed. The inner section is provided with a bottom, $b$, which is a disk, and supports the cheese placed thereon, and in the act of turning said inner section the bottom board, holding the cheese, turns with it. The outer section is provided with closed sides $c$, of metal or wood, while the inner section is provided with corresponding sides $d$ of wire-cloth, which allow proper ventilation. On each end of the outer section are square shoulders $f\ f$, and the faces of these, together with the upper edge $l$, are covered with flat pieces of rubber, or equivalent packing-strips $h\ h\ h$. Those at the top and the right hand have projecting edges, which bear, respectively, upon the top and side of the inner section, while that at the left hand stands square to receive the contact of a stop, $k$, of the inner section. When the box is closed, these packings fit closely around the whole margin-joint between the two sections, and effectively exclude flies and other insects, and also dust. The packing at the left also receives the impact of the movable section in closing, and thus prevents concussion and noise if the box is forcibly closed. Rollers are used between the two sections, as shown by the dotted lines, Fig. 2, to lessen friction in opening and closing.

The box may be mounted on casters, so as to be easily moved to any position.

My box differs essentially from others in two particulars—first, in being made of two pivoted sections, closing one within the other, and having a rotating bottom attached to the inner one, that turns with it, so as to bring the cheese to proper position automatically for cutting; and, second, in the employment of the packing-strips $h\ h\ h$, whereby a tight joint is made between the sections when closed, thereby excluding insects, dust, and all extraneous matter. This greatly lessens the labor in turning heavy cheeses, which frequently weigh seventy-five or one hundred pounds, and the packings make the cheese much more secure from flies than ordinary boxes having loose joints.

I am aware that boxes are known having slides, and provided with rotary platforms, which, however, are usually mounted independently of the turning section of the box, and have to be moved to turn the cheese after the box has been opened, thus requiring a double action.

When the box is closed, the cheese is turned so that its rind stands outward next to the wire-cloth, and the cut side inward. By this means it does not become dried up, but is properly ventilated.

Having thus described my invention, I do not claim slides, nor a rotary platform in a cheese-box; but

What I claim is—

The half-circular sections A B, turning one within the other, the bottom $b$, attached to the inner section and turning with it, and the packings $h\ h\ h$ at the joints between the sections, all combined and arranged to operate in the manner and for the purpose specified.

In witness whereof I have hereunto signed my name in the presence of two subscribing witnesses.

W. P. QUACKENBUSH.

Witnesses:
  O. A. EDDY,
  D. S. ROSS.